(12) United States Patent
Ratto et al.

(10) Patent No.: US 10,696,485 B2
(45) Date of Patent: Jun. 30, 2020

(54) METHOD FOR PACKAGING PRODUCTS AND CORRESPONDING PACKAGING LINE

(71) Applicant: SOREMARTEC S.A., Findel (LU)

(72) Inventors: Gabriele Ratto, Alba (IT); Sergio Mansuino, Castiglione Falletto (IT)

(73) Assignee: SOREMARTEC S.A., Findel (LU)

( * ) Notice: Subject to any disclaimer, the term of this patent is extended or adjusted under 35 U.S.C. 154(b) by 0 days.

(21) Appl. No.: 16/225,114

(22) Filed: Dec. 19, 2018

(65) Prior Publication Data

US 2019/0193941 A1 Jun. 27, 2019

(30) Foreign Application Priority Data

Dec. 21, 2017 (LU) .................................... 100590

(51) Int. Cl.
| | | |
|---|---|---|
| B65G 21/12 | (2006.01) |
| B65G 15/24 | (2006.01) |
| B65B 35/44 | (2006.01) |
| B65G 1/137 | (2006.01) |
| B65G 47/71 | (2006.01) |
| B65B 65/00 | (2006.01) |
| B65G 43/10 | (2006.01) |

(52) U.S. Cl.
CPC .............. *B65G 21/12* (2013.01); *B65B 35/44* (2013.01); *B65G 1/137* (2013.01); *B65G 15/24* (2013.01); *B65G 47/71* (2013.01); *B65B 65/003* (2013.01); *B65G 43/10* (2013.01); *B65G 2812/02019* (2013.01)

(58) Field of Classification Search
CPC .......... B65G 47/71; B65G 43/10; B65B 35/24
See application file for complete search history.

(56) References Cited

U.S. PATENT DOCUMENTS

| | | | | | |
|---|---|---|---|---|---|
| 4,166,525 | A | * | 9/1979 | Bruno | B65G 47/71 |
| | | | | | 198/369.2 |
| 4,281,756 | A | * | 8/1981 | Bruno | B65G 43/08 |
| | | | | | 198/369.2 |
| 4,593,806 | A | * | 6/1986 | Tappe | B65G 47/5122 |
| | | | | | 198/369.7 |
| 5,109,650 | A | * | 5/1992 | Hogenkamp | B65G 47/5113 |
| | | | | | 198/347.1 |
| 5,191,965 | A | * | 3/1993 | Scheid | B65G 21/14 |
| | | | | | 198/460.2 |
| 9,604,258 | B2 | * | 3/2017 | Layne | B07C 5/36 |
| 10,233,034 | B2 | * | 3/2019 | Philipp | B65B 35/44 |

* cited by examiner

*Primary Examiner* — William R Harp
(74) *Attorney, Agent, or Firm* — Rothwell, Figg, Ernst & Manbeck, P.C.

(57) ABSTRACT

A packaging method is implemented via an industrial plant including a formation of packaging machines (M1-M4) arranged in succession and supplied via one and the same conveyor line (120). The method includes operating the machines further downstream as primary machines and the machines further upstream as reserve machines and establishing a constant presence of products on the conveyor line for each primary machine.

11 Claims, 4 Drawing Sheets

METHOD FOR PACKAGING PRODUCTS AND CORRESPONDING PACKAGING LINE

CROSS REFERENCE TO RELATED APPLICATION

This application claims priority to Luxembourgian Patent Application No. 100590 filed on Dec. 21, 2017, the disclosures of which is incorporated herein in its entirety by reference.

TECHNICAL FIELD AND PRIOR ART

The present invention relates to a method for packaging products via an industrial packaging plant.

Figure 3:
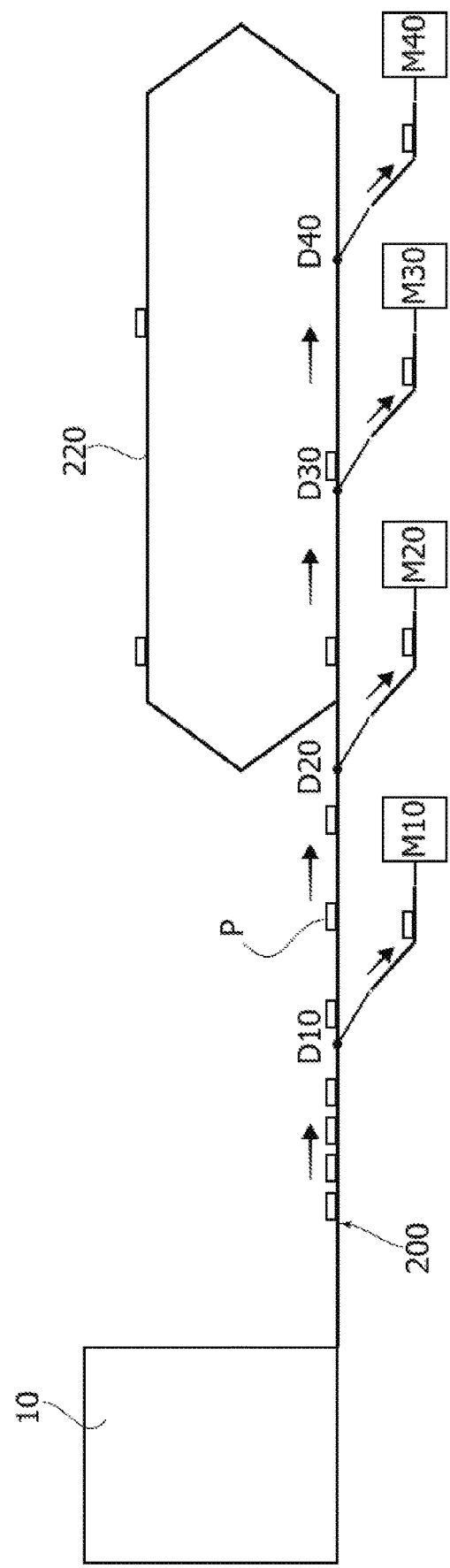

FIG. 3 is a schematic illustration of one of the possible configurations of a packaging plant according to the prior art. This plant develops downstream of the line for production of the products to be packaged, designated in the figures by the reference 10, and presents a formation of packaging machines M10-M40 arranged in succession along a conveyor line 200, which receives the products from the production line upstream and feeds them to the individual machines. These are usually identical to one another but are operatively divided into primary machines, which are designed to operate in a constant and continuous way, and reserve machines (usually one or two in number), which are, instead, designed to intervene during possible stoppages of the primary machines.

The products are delivered by the conveyor line 200 to the individual machines at respective delivery points D10-D40, where a conveyor receives the products from the conveyor line and feeds them to the respective packaging machine.

The conveyor line 200 terminates on a recirculation line 220, which is designed to feed the products that have reached the end of the conveyor line without being picked up in any of the delivery points back again upstream at least of some of the aforesaid points so that they can again pass along part of the line 200.

According to the prior art, operation of this type of plant envisages distributing the products between the various packaging machines according to a priority of delivery that follows the order of arrangement along the line, taking into account the processing availability along the branches that lead to the individual machines.

To exemplify this principle with reference to the line of FIG. 3, for a product P that, at output from the production line 10, is released onto the line 200 and reaches the delivery point D10, it is verified whether it is possible to send it directly to the first primary machine M10, determining whether on the respective branch there is or not availability for receiving it. If there is, the product is transferred onto that branch; otherwise, it is fed towards the primary machine M20, and then, possibly, towards the primary machine M30, and so forth, until it encounters a branch of one of the packaging machines where there is availability.

Hence, in general, the products are fed to the first machines that they find "free" along the line. The products that reach the end of the conveyor line without finding any availability are made to recirculate on the recirculation line 220, preventing the product from being discarded.

The above operating mode entails a series of disadvantages.

First of all, the primary machines that are arranged further downstream may, quite often, be unused owing to lack of products.

This is not simply due to the fact that the products are prevalently assigned to the machines upstream, where possible.

In this regard, it should in fact be noted that the products that are not taken up by the machines upstream and reach the machines further downstream, reach the latter at intervals that are altogether variable and non-controllable.

For each of these machines that is located further downstream, it may hence occur that at successive instants close to one another, various new products pass through the corresponding delivery point, but only some of these will be released to the branch of the machine on account of its limited availability, and that, subsequently, the waiting time for awaiting arrival of new products is, instead, prolonged.

Once the products on the respective branch have run out, the machine will thus stop, notwithstanding the various products that have by now passed beyond the delivery point of the machine and that possibly will be made to recirculate.

Consequently, the various stoppages of the machines further downstream are evidently the effect of a distribution of the products that proves far from efficient.

Moreover, as emerges from the example illustrated above, this conventional operating mode involves practically constant use of the recirculation line, this determining, on the one hand, the fact that many of the products travel for relatively long stretches before being packaged, and, likewise, the fact that jams may be created in the circulation of the products, in particular at the intersection between the main conveyor line and the recirculation line.

In the final analysis, this operating mode does not enable efficient operation of the machines and of the plant as a whole, and, above all, does not allow a packaging order of the "first in, first out" type to be respected.

OBJECT OF THE INVENTION

In this context, the object of the present invention is to provide a packaging method that will overcome the disadvantages referred to above.

The above object may be achieved through a method for packaging in succession products coming from a production line, via a packaging plant. The packaging plant is of the type comprising a formation of packaging machines (M1-M4) and a conveying line (120). The formation of packaging machines (M1-M4) is constituted by at least one first packaging machine (M3) and one second packaging machine (M4). The conveying line (120) receives the products coming from the production line and feeds them towards the machines of said formation. The first and second machines are arranged in succession along the line so that the first machine is upstream of the second machine with respect to the flow of products on the line. Identified on the conveying line (120) are: a first delivery point (D3), where a first conveying section (T3) is provided, configured to feed the products from the first delivery point to the first machine (M3); and a second delivery point (D4), where a second conveying section (T4) is provided, configured to feed the products from the second delivery point (D4) to the second machine (M4). The method includes providing, on the conveying line, a first accumulation station (S3) upstream of the first delivery point (D3) and a second accumulation station (S4) downstream of said first delivery point (D3) and upstream of the second delivery point (D4). The method comprises feeding products along the conveying line towards the first and second delivery points (D3, D4). The method includes providing, in the second accumulation station, a constant presence of products, and feeding in succession the products to the second machine by means of the second conveying section (T4). The method includes providing, in the first accumulation station, a constant presence of products, and feeding said products towards said first machine (M3) or towards the second delivery point (D4) according to the number of products present in the second accumulation station (S4).

A further object of the present invention is a packaging plant for packaging products coming from a production line. The plant may include a formation of packaging machines (M1-M4) and a conveying line (120). The formation of packaging machines (M1-M4) is constituted by at least one first packaging machine (M3) and one second packaging machine (M4). The conveying line (120) receives the products coming from the production line and feeds them to the machines of the formation. The first and second machines (M3, M4) are arranged in succession along the line so that the first machine is upstream of the second machine with respect to the flow of products on the line (120). Identified on the conveyor line (120) are: a first delivery point (D3), where a first conveying section (T3) is provided, configured to feed the products from the first delivery point (D3) to the first machine (M3); and a second delivery point (D4), where a second conveying section is provided, configured to feed the products from the second delivery point (D4) to the second machine (M4). The provided on the conveying line are a first product-accumulation station (S3), upstream of the first delivery point (D3), and a second product-accumulation station (S4), downstream of the first delivery point (D3) and upstream of the second delivery point (D4), and the stations (S3, S4) are provided with a respective control assembly for controlling the flow of products.

The claims form an integral part of the technical teaching provided herein in relation to the invention.

BRIEF DESCRIPTION OF THE DRAWINGS AND DETAILED DESCRIPTION OF ONE OR MORE EMBODIMENTS OF THE INVENTION

Figure 1:
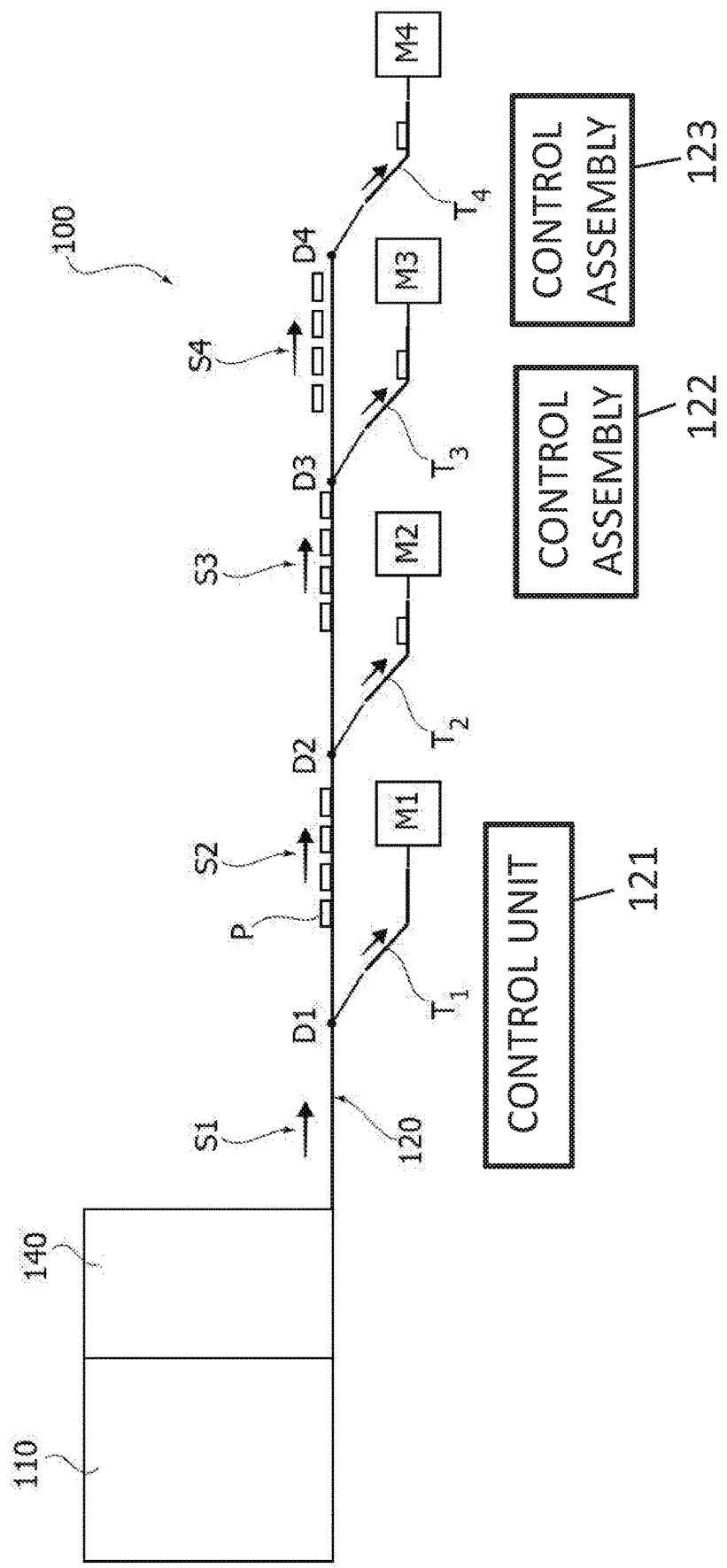
Figure 4B:
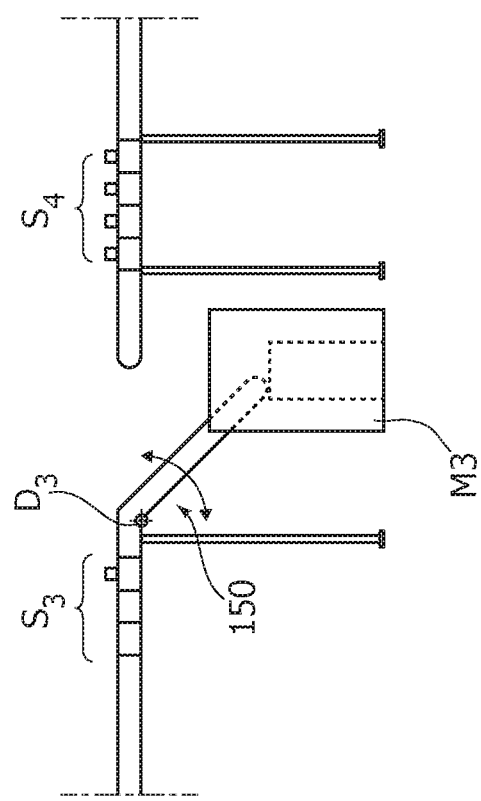
Figure 4A:
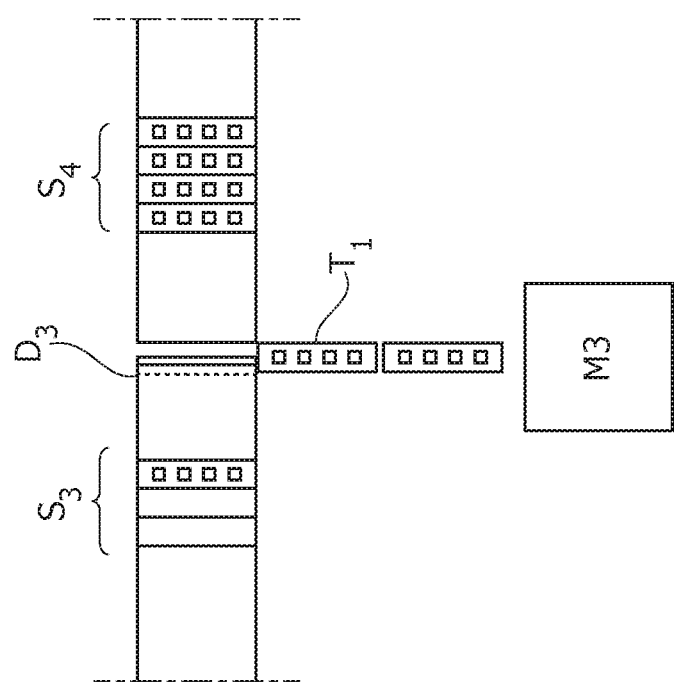

Further characteristics and advantages of the invention will emerge clearly from the ensuing description with reference to the annexed drawings, which are provided purely by way of non-limiting example and in which:

FIG. 1 is a schematic illustration of a preferred embodiment of the packaging plant described herein;

FIGS. 2A, 2B, 2C, and 2D illustrate successive steps of operation of the plant of FIG. 1 according to the method described herein;

FIG. 3 is a schematic illustration of a packaging plant according to the prior art; and FIGS. 4A and 4B are schematic illustrations of an example of embodiment of a stretch of the line 120, according to a top plan view and a side view, respectively.

In the ensuing description, various specific details are illustrated aimed at enabling an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated above, the present invention regards a packaging method implemented via an industrial plant.

FIG. 1 illustrates an industrial plant according to a preferred embodiment for implementing the method described herein.

With reference to FIG. 1, the packaging plant, designated as a whole by the reference number 100, is once again set downstream of a line 110 for production of products P, and comprises a conveyor line 120, arranged along which is a formation of packaging machines M1-M4 set in succession, as in the plant according to the prior art described at the start.

Defined on the line 120 are respective points D1-D4 for delivery of the products P to the individual machines, where conveyors T1-T4 that feed the products from the delivery points to the respective machines are located.

Upstream of each delivery point, the line 120 envisages respective stations S1-S4 for accumulation of the products. Preferably, these stations are located in positions immediately adjacent to the corresponding delivery points downstream, without interposition of further sectors or stations of the line. In various preferred embodiments, like the one illustrated, the aforesaid accumulation stations are configured so that the products will be accumulated in queues that extend according to an orientation coinciding with that of the conveyor line. Within the individual station, the products in a queue move towards the downstream end of the station, from where they are then fed at output towards the delivery point downstream. Further characteristics of the accumulation stations will be discussed hereinafter.

According to a preferred embodiment of the plant described herein, this moreover envisages a buffer storage unit 140, which is set between the production line 110 and the conveying line 120. The characteristics of this unit and operation thereof will be described hereinafter.

In general, the indicated conveying means for conveying the products to the delivery points and, thereafter, for feeding the products to the packaging machines, as well as the accumulation stations and the buffer storage unit, can be of any known type adapted for the indicated purposes.

The packaging method described herein is based upon a logic diametrally opposite to the one presented at the start according to the prior art. It envisages, in fact, distribution of the products between the various machines of the plant according to a criterion of priority that is exactly reverse with respect to the order in which the machines are arranged along the line, i.e., giving precedence to the machines that are located further downstream over the ones that are located further upstream.

With reference to FIG. 1, this in the first place means that, according to this method, for example, the machines M4, M3, and M2 are considered as primary machines, whereas the machine M1 is considered as reserve machine.

Clearly, the number of primary machines and reserve machines may vary according to the requirements of the various applications, but, irrespective of their number, the criterion followed by the method described herein is in any case that the machines arranged at the end of the line will be considered as primary machines and the machines arranged further upstream will be considered as reserve machines.

At the same time, the method described herein envisages that in the accumulation stations upstream of the delivery points of the primary machines there will be a constant supply of products present in a controlled number, and that the products leaving each station and directed to the corresponding delivery point will be either fed to the machine of the delivery point or else allowed to proceed towards the machine further downstream, according to the number of products present in the next accumulation station.

In particular, the method envisages that, if the products present in the next accumulation station are in a number lower than a pre-set value, the product arriving at the delivery point will be allowed to proceed towards the next accumulation station, whereas, if the products in question are in a number corresponding to or higher than said pre-set value, that product arriving will be directly fed to the packaging machine of the delivery point that it has reached.

It should be noted that the term "product" is used herein in a broad sense to indicate any entity undergoing processing by the individual packaging machine, which can be represented either by just one product or else by an array of products and that can be used as measure of the working cycle of the machine. The product or products in question may be naked or already enclosed in wrapping.

FIGS. 2A to 2D exemplify the modality of control of the flow of the products indicated above, focusing attention on the last two primary machines M3, M4.

First of all, it should be noted that the two stations S3 and S4 do not feed at output any product until there is a new availability in the branches T3, 14 immediately downstream, or else, with reference to just the station S3, until there is a new availability in the next station S4.

Figure 2B:
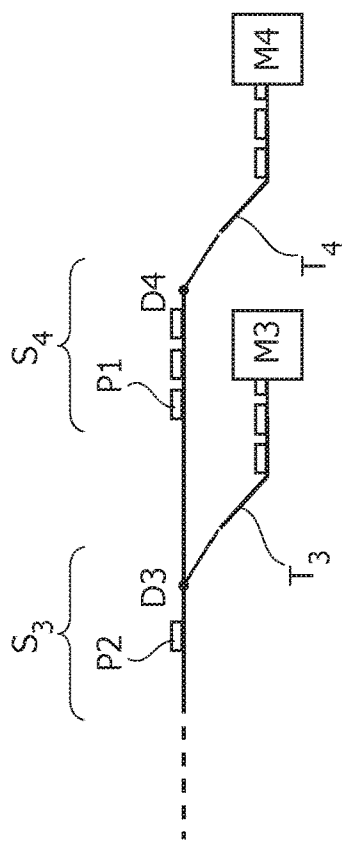
Figure 2D:
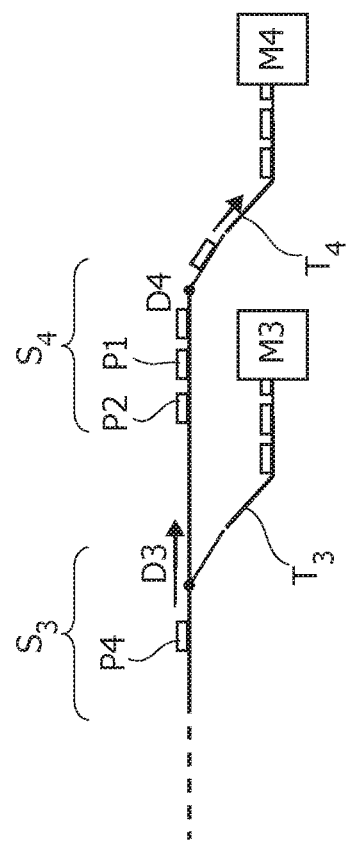
Figure 2A:
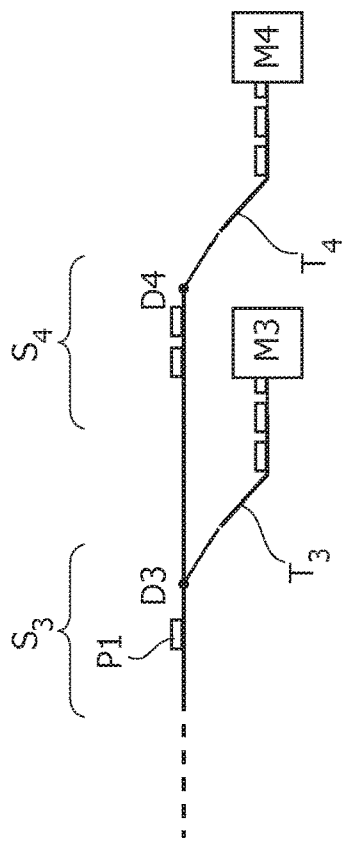
Figure 2C:
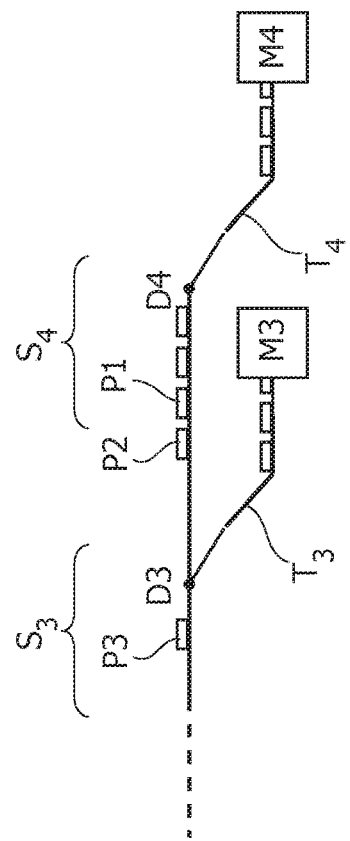

Assuming now that the pre-set number of products assigned to the individual accumulation stations is four, in the condition illustrated in FIG. 2A, where only two products are present at the station S4, the product P1 leaving the station S3 reaches the delivery point D3 and is then made to proceed towards the next station S4 and the delivery point D4.

The same applies to the product P2 that is fed by the station S3 when only three products are still present in the station S4 (FIG. 2B).

Instead, when the product P3 is fed by the station S3 (FIG. 2C), in the station S4 there are by now present four products, i.e., a number of products equal to the pre-set number referred to above, so that this time when the product P3 reaches the delivery point D3, it is fed directly to the packaging machine M3.

In the meantime, clearly the machines M3 and M4 operate continuously, packaging the products as they accumulate along the respective branches T1-T4. Whenever there is availability on these branches, a new product is transferred onto the branch by the accumulation station set upstream, a position thus being freed therein.

In this connection, FIG. 2D illustrates a condition in which a position has just been freed in the station S4. Consequently, the product P4 that is supplied immediately after by the station S3, reaches the delivery point D3 and is made to proceed further towards the station S4 and the delivery point D4.

The logic of distribution of the products described above is applied between each machine of the plant and the next.

In view of what has been said previously, it may first of all be noted that, thanks to the constant presence of products provided in the accumulation stations adjacent to the delivery points of the primary machines, the latter are set in the condition to operate in a continuous and constant way (obviously, within the limits imposed by the fluctuations of the flow of products at output from the production line).

The products in these stations constitute, in fact, a guarantee for an immediate feed of new products to the packaging machine.

Moreover, the operating method described herein guarantees handling of the products of a "first in, first out" type.

In fact, unlike the operating mode according to the prior art, there can never be a product that reaches the end of the conveyor line without having been taken up by any of the packaging machines.

Instead, thanks to the logic of the method described herein, by way of the priority that is given to the primary machines downstream, the latter work at full regime, and the products that are fed towards them are certainly processed. When then these machines are saturated, the new products released on the conveyor line do not reach the end of the line, after which they are either discarded or recirculated, but are sent directly to the machines located further upstream, which are immediately available for handling the products.

It should be noted, once again, that since feed of the products to a given machine depends merely upon the number of products in a queue upstream of the delivery point of the next machine, control of the various flows of products is considerably simplified in so far as it is sufficient for each delivery point to know the number of products in a queue upstream of the next delivery point, totally disregarding, on the other hand, what is happening in the other points of the line.

Control of the flows of product is clearly managed by control units 121 connected to the various devices of the plant.

With reference now to FIG. 4, this is a schematic illustration of an example of embodiment of a stretch of the line 120.

As may be seen in the above figure, the accumulation stations S3, S4 constitute to all effects portions of the conveyor line 120. Their extension in the direction of the line is clearly a function of the maximum accumulation capacity required of them.

The aforesaid stations are each prearranged with a corresponding assembly 122 or 123 for control of the flow of the products, which has the function of forming the queue of products within the station, feeding them, within the station, according to a movement independent of the motion of advance of the feeding stretch upstream, for example according to a step-by-step movement, and feeding at output the products that proceed one after another towards the downstream end of the station, according to the modalities discussed above.

In general, the above assembly may envisage means of a known type, conventionally used in the reference technical field, for the formation of queues on conveying lines. For instance, this assembly may comprise arrest members that can be activated in a controlled way, which are arranged in series along the station and are designed to stop in respective pre-set positions the products that are advancing along the line. As further example, the aforesaid assembly may alternatively present a series of individual conveyor belts, which are arranged in mutual succession and operate intermittently.

The corresponding delivery points downstream of the accumulation stations are, instead, prearranged with appropriate distribution devices, for example deflector members, for directing the flow of products that are arriving either downstream, along the distribution line, or else towards the corresponding packaging machine. In any case, the mentioned distribution devices can be of any known type adapted for the indicated purposes.

With reference to the example of FIG. 4, provided in the delivery point D3 is a deflector member 150 oscillating in a vertical plane, between a horizontal position, in which it feeds the products arriving along the remaining part of the conveyor line 120, and a lowered position, in which it feeds the products to the feed branch T3 of the packaging machine M3.

To return to FIG. 1, the plant used for implementing the method described herein may envisage a buffer storage unit 140 set between the production line 110 and the conveyor line 120.

The buffer storage unit 140 can be used for temporarily accumulating the products coming off the production line in the case where one or more of the packaging machines were stopped for any reason (for example, for maintenance or replacement of a component) and the remaining machines are not able, by themselves, to handle the flow of products coming from the production line.

Preferably, the aforesaid buffer storage unit is configured so as to have, at input, a capacity of reception of the products at least equal to the capacity of the production line, and, at output, a capacity of feeding the products that ranges from 0 pieces/min to a maximum capacity that is higher than the capacity of the production line and, preferably, higher than or equal to the overall capacity of the packaging machines.

In this way, in the case, for example, of blocking of the entire packaging line, the buffer storage unit is able to receive temporarily the products at output from the production line without the latter having to be stopped, and, once the packaging machines start operating again, is able to generate, at output, a flow of products that in a short time brings the packaging machines to operate again at full regime.

The buffer storage unit in question may be of any type conventionally used in the sector. Preferably, it is provided with a by-pass line that enables the products to reach the delivery points of the packaging machines immediately when no action of accumulation by the buffer storage unit is necessary.

In various preferred embodiments, the buffer storage unit in question may moreover be prearranged for constituting a conditioning station of the production line for keeping the product in an optimal condition (for example, a cooling station), preferably in the case where the line requires this type of station. This leads to a double advantage:

on the one hand, overall extension of the plant is reduced; and on the other hand, the products are kept in the pre-set conditions of temperature and humidity even when they have to remain in the buffer storage unit for a prolonged period of time.

To return to the packaging method described herein, it should again be noted that it may be advantageous to vary, during operation of the plant, the aforesaid pre-set number assigned to the accumulation stations, on the basis of the actual conditions of operation of the plant.

For instance, in concomitance with a stoppage of one of the packaging machines, it may be advantageous to increase the above number so as to provide additional storage capacity to the advantage of the entire line. This may be implemented in concomitance with start-up of the reserve machine or machines designed to replace the primary machine that is momentarily not in operation. Once the normal operating conditions of the line have been restored, the pre-set number may be brought back to the "normal" value used prior to machine stoppage. This mode of control of the packaging line affords greater autonomy for the production line upstream.

Of course, without prejudice to the principle of the invention, the details of construction and the embodiments may vary, even significantly, with respect to what has been illustrated herein purely by way of non-limiting example, without thereby departing from the scope of the invention, as defined in the annexed claims.

The invention claimed is:

1. A method for packaging in succession products coming from a production line, via a packaging plant comprising:
a formation of packaging machines constituted by at least one first packaging machine and one second packaging machine; and
a conveying line, which receives the products coming from said production line and feeds them towards the machines of said formation, said first and second machines being arranged in succession along said line so that said first machine is upstream of said second machine with respect to the flow of products on said line,
wherein identified on said conveying line are: a first delivery point, where a first conveying section is provided, configured to feed the products from said first delivery point to said first machine; and a second delivery point, where a second conveying section is provided, configured to feed the products from said second delivery point to said second machine;
said method comprising:
providing, on said conveying line, a first accumulation station upstream of said first delivery point and a second accumulation station downstream of said first delivery point and upstream of said second delivery point;
feeding products along said conveying line towards said first and second delivery points;
providing, in said second accumulation station, a constant presence of products, and feeding in succession said products to said second machine by means of said second conveying section;
providing, in said first accumulation station, a constant presence of products, and feeding said products towards said first machine or towards said second delivery point according to the number of products present in said second accumulation station;
assigning to said second accumulation station a pre-set number and directing the products in said first accumulation station towards said first machine or towards said second accumulation station, on the basis of a comparison between the number of products present in said second station and said pre-set number;
feeding the products in said first accumulation station towards said second accumulation station if said number of products in said second accumulation station is lower than said pre-set number and feeding, instead, said products towards said first machine if said number of products in said second accumulation station is higher than or equal to said pre-set number.

2. The method according to claim 1, further comprising varying said pre-set number according to the operating conditions of the plant.

3. The method according to claim 2, further comprising increasing said pre-set number in the event of stoppage of one or more machines of said formation of packaging machines, and bringing it back to a lower value once said machines have resumed operation.

4. The method according to claim 1, further comprising operating only a portion of the machines of said formation that are arranged further downstream along said conveying line, and using, instead, one or more machines of said formation arranged further upstream as ancillary or reserve machines in the event of stoppage of one or more of the portion of the machines of said formation.

5. The method according to claim 4, further comprising varying said pre-set number according to an active or inactive state of said ancillary machines.

6. The method according to claim 1, implemented via a plant comprising a buffer storage unit set upstream of said formation of machines and operable to accumulate temporarily the products at output from said production line, said method comprising varying said pre-set number according to the degree of filling of said buffer storage unit.

7. A plant for packaging products coming from a production line, said plant comprising:
a formation of packaging machines constituted by at least one first packaging machine and one second packaging machine;
a conveying line, which receives the products coming from said production line and feeds them to the machines of said formation, said first and second machines being arranged in succession along said line so that said first machine is upstream of said second machine with respect to the flow of products on said line,
wherein identified on said conveyor line are: a first delivery point, where a first conveying section is provided, configured to feed the products from said first delivery point to said first machine; and a second delivery point, where a second conveying section is provided, configured to feed the products from said second delivery point to said second machine;
wherein provided on said conveying line are a first product-accumulation station, upstream of said first delivery point, and a second product-accumulation station, downstream of said first delivery point and upstream of said second delivery point, and said stations are provided with a respective control assembly for controlling the flow of products,
wherein provided in said first delivery point is a distributor device, configured to direct the flow of products arriving either towards said second accumulation station or towards said first packaging machine,
said plant comprising at least one control unit configured to control said control assembly of said first accumulation station and said distributor device in said first delivery point according to a signal indicating the number of products present in said second accumulation station,
said control unit being configured to control said control assembly of said first accumulation station and said distributor device in said first delivery point, according to the following steps:
providing, in said second accumulation station, a constant presence of products, and feeding in succession said products to said second machine by means of said second conveying section;
providing, in said first accumulation station, a constant presence of products, and feeding said products towards said first machine or towards said second delivery point according to the number of products present in said second accumulation station,
assigning to said second accumulation station a pre-set number and directing the products in said first accumulation station towards said first machine or towards said second accumulation station, on the basis of a comparison between the number of products present in said second station and said pre-set number; and
feeding the products in said first accumulation station towards said second accumulation station if said number of products in said second accumulation station is lower than said pre-set number and feeding, instead, said products towards said first machine if said number of products in said second accumulation station is higher than or equal to said pre-set number.

8. The plant according to claim 7, wherein said control assembly is configured to feed the products, within the station, according to a movement independent of the motion of advance of the stretch of feed upstream of the station, and to feed at output the products that proceed one after another to the downstream end of the station.

9. The plant according to claim 7, comprising, upstream of said formation of machines, a buffer storage unit configured to accumulate temporarily the products at output from said production line.

10. The plant according to claim 9, wherein said buffer storage unit is configured so as to have a capacity of reception of the products into an input of said buffer storage unit that is at least equal to the capacity of the production line, and a capacity of feeding the products from an output of said buffer storage unit that ranges from 0 pieces/min to a maximum capacity that is greater than the capacity of the production line and approximately equal to the overall packaging capacity of said formation of packaging machines.

11. The plant according to claim 9, wherein said buffer storage unit is configured to constitute a conditioning station for the products.

* * * * *